(12) United States Patent
Horikoshi et al.

(10) Patent No.: US 7,936,403 B2
(45) Date of Patent: May 3, 2011

(54) LIQUID CRYSTAL DISPLAY APPARATUS HAVING BOTH ORGANIC AND INORGANIC POLARIZERS

(75) Inventors: Ryoko Horikoshi, Kanagawa (JP); Yuji Manabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 114 days.

(21) Appl. No.: 12/141,241

(22) Filed: Jun. 18, 2008

(65) Prior Publication Data

US 2008/0316396 A1    Dec. 25, 2008

(30) Foreign Application Priority Data

Jun. 20, 2007  (JP) ............................... P2007-162823

(51) Int. Cl.
*G02F 1/1335* (2006.01)
(52) U.S. Cl. .............................................. 349/9; 349/96
(58) Field of Classification Search ................ 349/5–10, 349/57, 96–103
See application file for complete search history.

(56) References Cited

U.S. PATENT DOCUMENTS

| | | | | |
|---|---|---|---|---|
| 2002/0089612 A1* | 7/2002 | Okada et al. | ...................... | 349/5 |
| 2004/0080677 A1* | 4/2004 | Kamei | ............................... | 349/5 |
| 2004/0246443 A1* | 12/2004 | Kim et al. | ........................ | 353/30 |
| 2005/0001984 A1* | 1/2005 | Ishino | ............................... | 353/31 |
| 2005/0134802 A1* | 6/2005 | Furuta et al. | ..................... | 353/20 |
| 2005/0237489 A1* | 10/2005 | Nakashima et al. | ............. | 353/20 |
| 2006/0061862 A1* | 3/2006 | Mi et al. | ......................... | 359/486 |
| 2007/0132924 A1* | 6/2007 | Okada | ............................ | 349/117 |
| 2007/0206165 A1* | 9/2007 | Yatsu et al. | ...................... | 353/98 |
| 2007/0253063 A1* | 11/2007 | Hruska | .......................... | 359/589 |

FOREIGN PATENT DOCUMENTS

| | | |
|---|---|---|
| CN | 1353321 | 6/2002 |
| JP | 10 133196 | 5/1998 |
| JP | 2000 356770 | 12/2000 |
| JP | 2003-279734 | 10/2003 |
| JP | 2004 138913 | 5/2004 |
| JP | 2005 84596 | 3/2005 |
| JP | 2005 107364 | 4/2005 |
| JP | 2005-346117 | 12/2005 |
| JP | 2006 64859 | 3/2006 |
| JP | 2006 323119 | 11/2006 |
| JP | 2007-102246 | 4/2007 |
| JP | 2007 108436 | 4/2007 |
| JP | 2008-268264 | 11/2008 |

* cited by examiner

*Primary Examiner* — Brian M. Healy
*Assistant Examiner* — Paul C Lee
(74) *Attorney, Agent, or Firm* — Frommer Lawrence & Haug LLP; William S. Frommer; Thomas F. Presson

(57) ABSTRACT

A liquid crystal display apparatus is provided. The liquid crystal display apparatus includes at least one incidence-side polarizer, a liquid crystal panel, at least one output-side polarizer, and a mechanism for turning each of the incidence-side polarizer and the output-side polarizer around an optical axis. The incidence-side polarizer is made of an inorganic material. The liquid crystal panel is provided for modulating the polarized state of light output from the incidence-side polarizer to output the modulated light. The output-side polarizer is made of an inorganic material for outputting the light incident from the liquid crystal panel.

13 Claims, 5 Drawing Sheets

LIQUID CRYSTAL DISPLAY APPARATUS HAVING BOTH ORGANIC AND INORGANIC POLARIZERS

CROSS REFERENCES TO RELATED APPLICATIONS

The present invention contains subject matter related to Japanese Patent Application JP 2007-162823 filed in the Japanese Patent Office on Jun. 20, 2007, the entire contents of which being incorporated herein by reference.

BACKGROUND OF THE INVENTION

1. Field of the Invention

The present invention relates to a liquid crystal display apparatus, particularly a projector for projecting light modulated through a liquid crystal panel on a screen.

2. Description of the Related Art

Heretofore, projectors have been used for extended projection of presentation materials for conferences and lectures. These projectors have been provided with higher luminance because of their uses under bright indoor conditions, unlike those for family use.

Such projector set with higher luminance is regarded as a higher-end model and the higher contrast thereof can be thus desired. In recent years, it is also important to reduce the costs of projectors as the projectors have become popular.

Such a projector forms an image by separating light from a light source into three different colors, red, green, and blue, through a wavelength-selectable filter and combining these red, green, and blue rays by a color-composition prism after passing through respective light modulation devices.

The light modulation device employs a liquid crystal panel. The well-known liquid crystal panel may be a twist nematic (TN) liquid crystal panel. In the TN liquid crystal panel, liquid crystal molecules are twisted in helical form in the direction parallel to a glass substrate without an applied voltage. The TN liquid crystal panel is configured such that light incident thereon can turn 90 degrees and pass therethrough (so-called "normally white"). Liquid crystal molecules stand up perpendicularly to the glass substrate when a voltage is applied, so that the transmission of light can be prevented. In the TN liquid crystal panel, the liquid crystals adjacent to the glass substrate may not completely stand up and are left inclined. Thus, light will be leaked at the time of black representation, leading to a decrease in contrast.

A vertically aligned (VA) liquid crystal panel is configured in contrast with the above configuration of the TN liquid crystal panel. In the VA liquid crystal panel, liquid crystal molecules stand up perpendicularly to the glass substrate without voltage application, resulting in normally black representation. When a voltage is applied, the liquid crystal molecule is inclined in parallel with the glass substrate and twisted to allow the transmission of light. With the VA liquid crystal panel configured as described above, such light leakage from the panel that occurs in the TN liquid crystal panel may not be caused at the time of black representation. Thus, the VA liquid crystal can attain higher contrast than that of the TN liquid crystal panel.

The costs of projectors have been decreased, and the liquid crystal panels also tend to be small-sized. In addition, the projector is provided with an incidence-side polarizer and an output-side polarizer in a crossed nicol state. Here, the incidence-side polarizer is provided for aligning the polarized state of light incident on the liquid crystal panel and the output-side polarizer is provided for the selective transmission of light output from the liquid crystal panel.

The polarizers, which have been typically used in the art, may be those in which a film formed by drawing out an organic dye material is attached on a base material (organic polarizer). Sapphire or other base material with high thermal conductivity is also used for such an organic polarizer with the projectors having been provided with higher luminance in recent years.

The polarizer having a structure different from the organic polarizer may be a reflective inorganic polarizer, such as a wire-grid (WG) polarizer, or an absorptive inorganic polarizer. These polarizers are also known in the art (see, for example, Japanese Unexamined Patent Application Publication No. 2006-323119) and have been commercially available.

Japanese Unexamined Patent Application Publication No. H10-133196 (Paragraph Nos. 0005 to 0008 and 0018 to 0020) proposes a technology that, with an organic polarizer being used, intends to reduce the thermal load on the polarizer by providing at least one of the incidence-side polarizer and the output-side polarizer to include a plurality of polarizers.

Further, for realizing a high contrast, a technology for providing a mechanism for turning an organic polarizer on the incidence side around an optical axis and a technology for arranging an optical compensator on the incidence-side or output-side of a liquid crystal panel have been also known in the art (Japanese Unexamined Patent Application Publication No. 2005-107364 Paragraph Nos. 0027, 0034, and 0038).

SUMMARY OF THE INVENTION

Projectors tend to increase light density following an increase in luminance thereof or a decrease in panel size thereof, so that it is desirable to prevent the deterioration of the polarizer more than ever. The polarizer made of an organic dye material generates heat by optical absorption to cause yellowing, missing, or burning, thereby leading to a decrease in contrast.

For preventing the polarizer from such a kind of deterioration, the polarizer should be cooled using a fan (air blower). In this case, however, there is a disadvantage in that the more the amount of cooling air increases depending on the degree of enhanced luminance, the more the noise of a fan increases.

Furthermore, as described above, it is also proposed to increase cooling efficiency by the use of a base material with high thermal conductivity, such as sapphire, in the organic polarizer. In this case, however, the base material may be expensive, so that there is a difficulty in lowering the cost.

The deterioration prevention has limitations even if a plurality of organic polarizers is only employed as described in Japanese Unexamined Patent Application Publication No. H10-133196 with the increase in the luminance of the projector. The number of the polarizers should be increased for satisfying the lifetime of the projector set with only the organic polarizers. Thus, there is a disadvantage in realizing the low cost because of an increase in the number of parts of the projector set.

The reflective polarizer, such as WG, made of an inorganic material as described in Japanese Unexamined Patent Application Publication No. 2006-323119 reflects light in a certain direction to exert its polarization property. Thus, it is known that the reflective polarizer can be provided with the effects of heatproof and deterioration prevention as a result of suppressing the generation of heat. However, when the light reflected from the reflective polarizer becomes light returning to the liquid crystal panel, the deterioration of image quality, such as the generation of ghost, may be caused.

In addition, the polarizer with a high extinction ratio has the property of lowering the transmissivity thereof (affecting luminance) and the polarizer with a low extinction ratio has the property of increasing the transmissivity thereof. In other words, it has been desired to produce a projector set with improvements focusing on luminance and contrast.

Furthermore, the level of black luminance can be reduced in the VA liquid crystal panel with the above-described configuration as compared with that in the TN liquid crystal panel. On the other hand, the black luminance can be easily affected by even a small variation in angles of the adjacent polarizers. Besides, there is a disadvantage of a significant impact on the contrast.

Furthermore, in the case of a projector with a TN liquid crystal panel, the contrast thereof can be adjusted to the maximum by turning only the incidence-side polarizer (or only the output-side polarizer) as described in Japanese Unexamined Patent Application Publication No. 2005-107364. In the case of a projector with a VA liquid crystal panel, the black luminance may not be minimized by turning only one of the incidence-side polarizer and the output-side polarizer.

Thus, it has been difficult to simultaneously obtain the high luminance, long product life, high contrast, low noise, and low cost of a projector. Therefore, it is desirable to provide a projector that satisfies high luminance while preventing a polarizer from deterioration, ensuring high contrast, and lowering the cost thereof.

According to an embodiment of the invention, there is provided a liquid crystal display apparatus. The liquid crystal display apparatus includes at least one incidence-side polarizer, a liquid crystal panel, at least one output-side polarizer, and a mechanism for turning each of the incidence-side polarizer and the output-side polarizer around an optical axis. The incidence-side polarizer is made of an inorganic material. The liquid crystal panel modulates the polarized state of light output from the incidence-side polarizer to output the modulated light. The output-side polarizer is made of an inorganic material for outputting the light incident from the liquid crystal panel.

In this liquid crystal display apparatus, at least one inorganic polarizer is used for each of polarizers to be arranged on the incidence side and the output side of the liquid crystal panel, respectively, to improve the thermal resistance and the light resistance of the polarizer and prevent it from deterioration.

Furthermore, the mechanism for turning each of the incidence-side polarizer and the output-side polarizer around the optical axis is provided so that incident light and output light are adjusted with high accuracy even in the case where a VA liquid crystal panel is used as a liquid crystal panel for increasing the contrast. The contrast can be adjusted at a maximum level even in the case of using the VA liquid crystal by turning each of the incidence-side polarizer and the output-side polarizer around the optical axis.

With the above configuration, a projector with high contrast and low noise, which satisfies high luminance while reducing the deterioration of the polarizer, can be provided at a low price.

According to the embodiment of the invention, a low-noise projector with high contrast, which satisfies high luminance while substantially avoiding the deterioration of the polarizer, can be provided at a low price.

DESCRIPTION OF THE PREFERRED EMBODIMENTS

First Embodiment

Hereinafter, embodiments of the invention will be described in detail with reference to the attached drawings. First, a first embodiment of the invention will be described.

Figure 1:
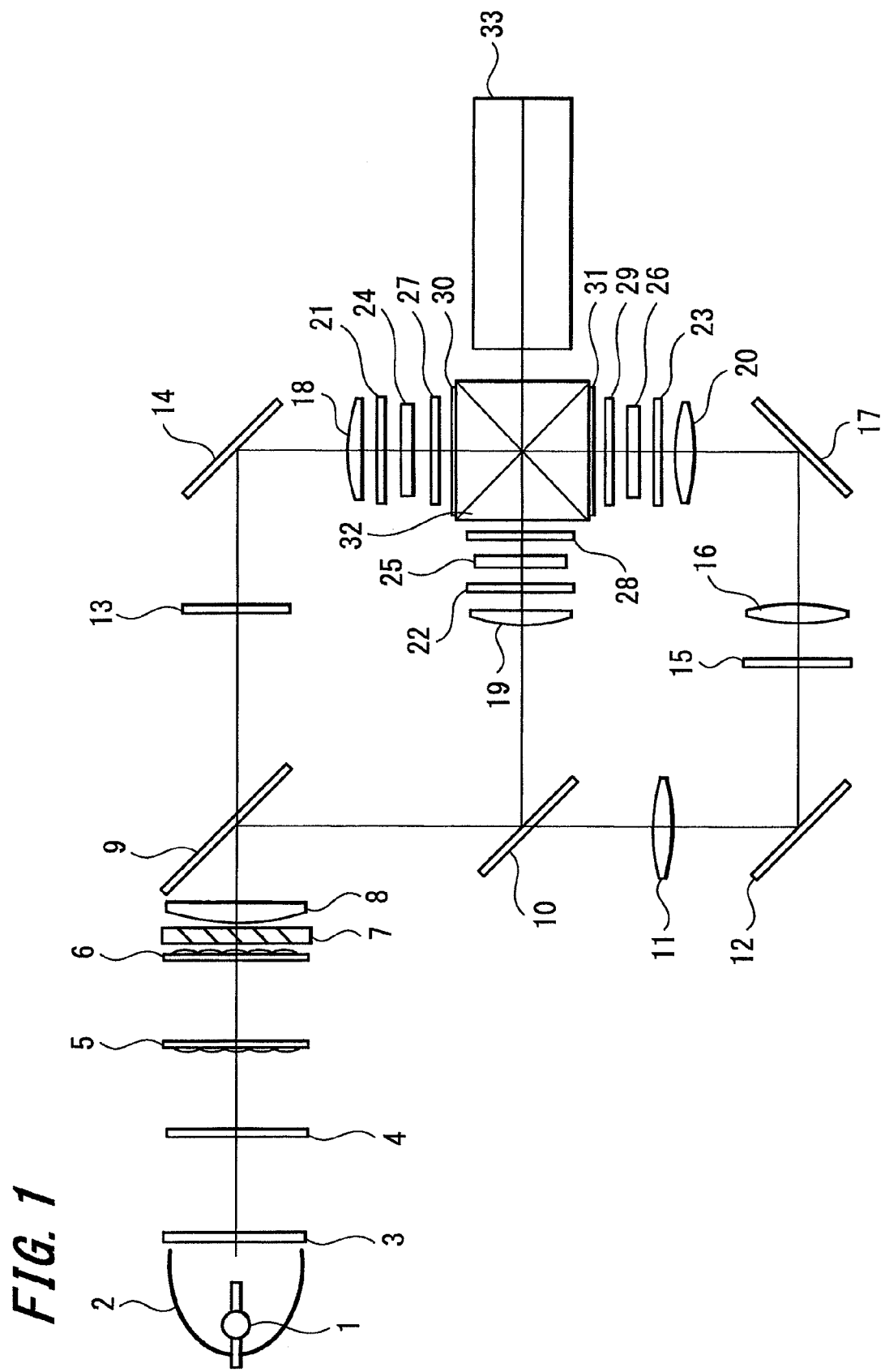
FIG. 1 is a diagram showing the entire configuration of an optical system of a projector according to a first embodiment of the invention.

FIG. 1 is a diagram illustrating the entire configuration of an optical system of a projector in accordance with the first embodiment of the invention. White natural light from a light source 1 with an extra-high pressure mercury lamp or the like is reflected on a reflector 2. The reflected light is incident on a UV cut-off filter 4 through an explosion-proof glass 3 covering the light-output surface of the reflector 2. The UV cut-off filter 4 blocks ultraviolet (UV) rays by reflection. The light output from the UV cut-off filter 4 is first incident on a first fly-eye lens 5 constituting an integrator together with a second fly-eye lens 6. Subsequently, the light is focused on the second fly-eye lens 6 and then incident on a PS convertor 7.

S-polarized light directly passes through the PC convertor 7, while P-polarized light is converted into the S-polarized light. As a result, the incident light is converted into single-polarization light. The light output from the PS convertor 7 is focused on a condenser lens 8 and then incident on a GR reflection dichroic mirror 9.

The GR reflection dichroic mirror 9 transmits blue light and reflects both green light and red light. A UV absorption filter 13 removes UV from the blue light passed through the GR reflection dichroic mirror 9A by absorption. After that, the blue light is reflected on a blue-light reflective mirror 14 and then focused on a blue-light condenser lens 18, followed by passing through an incidence-side inorganic polarizer 21. Subsequently, the blue light is incident on a vertically aligned (VA) liquid crystal panel 24 for blue representation.

Green light and red light reflected on the GR reflection dichroic mirror 9 are incident on a G reflection dichroic mirror 10. The green light is reflected on the G reflection dichroic mirror 10, while the red light passes therethrough. The green light reflected from the G reflection dichroic mirror 10 is focused on a green-light condenser lens 19 and then transmitted through an incidence-side inorganic polarizer 22, followed by entering a VA liquid crystal panel 25 for green representation.

The red light transmitted through the G reflection dichroic mirror 10 passes through a first relay lens 11 and is then reflected on a red-light reflective mirror 12. Light components other than the red light is removed by a R-transmission filter 15 and the red light is then reflected on a red-reflective mirror 17 after passing through a second relay lens 16. The red light is focused on a red-light condenser lens 20 and then transmitted through an incidence-side inorganic polarizer 23. Subsequently, the red light is incident on a VA liquid crystal panel 26 for red representation.

The blue light, the green light, and the red light incident on their respective VA liquid crystal panels 24, 25, and 26 are modulated according to the levels of R, G, and B image signals, respectively. The blue light, the green light, and the red light output from the VA liquid crystal panels 24, 25, and 26 are incident on output-side inorganic polarizers 27, 28, and 29, respectively. Note that the output-side inorganic polarizers 27, 28, and 29 transmit only P-polarized light.

The blue light and the red light transmitted through the output-side inorganic polarizers 27 and 29 are subjected to the conversion of P-polarized light into S-polarized light at ½ wavelength plates 30 and 31 and then incident on a color-composition prism 32, respectively. The green light transmitted through the output-side inorganic polarizer 28 is directly incident on the color-composition prism 32. Subsequently, the color-composition prism 32 transmits the P-polarized light and reflects the S-polarized light in the same direction as that of the P-polarized light, thereby combining the green light, the blue light, and the red light. The light output from the color-composition prism 32 is expanded and projected from a projection lens 33 onto a screen (not shown).

Figure 2:
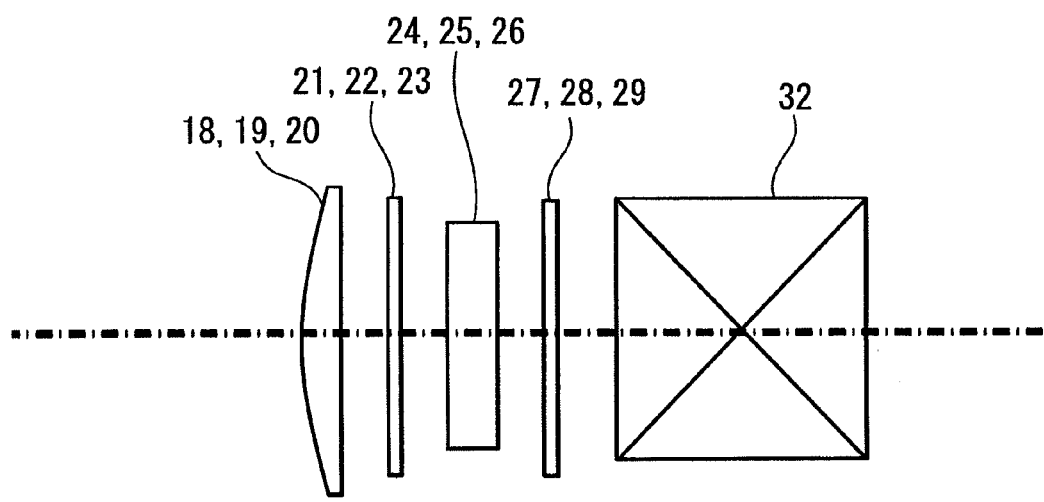
FIG. 2 is a diagram illustrating parts adjacent to a VA liquid crystal panel shown in FIG. 1.

FIG. 2 is a diagram illustrating the parts adjacent to the VA liquid crystal panels 24, 25, and 26 in the optical system illustrated in FIG. 1. The configuration of the parts adjacent to the respective VA liquid crystal panels 24, 25, and 26 are common, so that the three reference numerals of FIG. 1 are given to the single condenser lens, the single VA liquid crystal panel, the single incidence-side inorganic polarizer, and the single output-side inorganic polarizer, respectively. The ½ wavelength plates 30 and 31 between the output-side inorganic polarizers 27 and 29 and the color-composition prism 32 are not shown in FIG. 2.

The VA liquid crystal panels 24, 25, and 26 are arranged so that they are sandwiched between the incidence-side inorganic polarizers 21, 22, and 23 and the output-side inorganic polarizers 27, 28, and 29, respectively. In the VA liquid crystal panel, liquid crystals are aligned in the direction perpendicular to a glass substrate without an applied voltage, becoming "normally black" representation. When voltage is applied, the liquid crystal molecules turn over in the direction parallel to the glass substrate and are then twisted in helical form, thereby allowing light to pass therethrough. With the above configuration, light leakage that occurs in the TN liquid crystal panel may not occur in the VA liquid crystal panel in the black representation. Thus, black luminance can be made small as compared with that of the TN liquid crystal panel. On the other hand, however, the black luminance can be greatly influenced by a certain deviation of the angle of the polarizer, which may be nothing to the TN liquid crystal panel. Therefore, it may cause a variation in contrast.

Therefore, though not shown in FIGS. 1 and 2, turning mechanisms for turning the incidence-side inorganic polarizers 21, 22, and 23 and the output-side inorganic polarizers 27, 28, and 29 around the optical axes, respectively, are provided.

Figure 3:
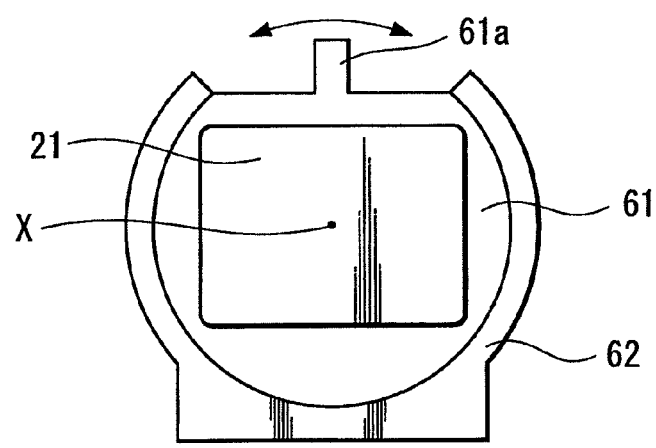
FIG. 3 is a diagram illustrating a turning mechanism of a polarizer.

The configurations of the turning mechanisms for the respective polarizers 21, 22, 23, 27, 28, and 29 are common, so that as a representative thereof FIG. 3 illustrates the exemplified configuration of the turning mechanism of the incidence-side inorganic polarizer 21. The incidence-side inorganic polarizer 21 is held in a holder 61. The holder 61 is supported on a supporting frame 62 placed in a fixed position with respect to the VA liquid crystal panels 24, 25, and 26 (FIG. 2) in the projector so that the holder 61 can turn around the optical axis X of the incidence-side inorganic polarizer 21.

A protrusion 61a to be held by fingers is formed on the holder 61. When the protrusion 61a is moved in the direction of the arrow in the figure on the plane perpendicular to the optical axis, the holder 61 turns in the supporting frame 62 and then the incidence-side inorganic polarizer 21 rotates around the optical axis.

It should be noted that the configuration of the turning mechanism illustrated in FIG. 3 is only provided as an example, so that a turning mechanism already known in the art may be alternatively employed.

At the time of the manufacture of a projector, turning positions of the incidence-side inorganic polarizers 21, 22, and 23 and the output-side inorganic polarizers 27, 28, and 29 are adjusted using the turning mechanisms. As a result, the polarized states of light incident on the VA liquid crystal panel 24, 25, and 26 from the incidence-side inorganic polarizers 21, 22, and 23 are leveled to align the polarizing axes of the output-side inorganic polarizers 27, 28, and 29 in the direction of polarization of output light. Therefore, even in the case of using the VA liquid crystal panel, the contrast of an image projected on a screen can be maximized by the adjustment.

In addition, since inorganic polarizers are used as the incidence-side polarizer and the output-side polarizer, respectively, the projector set may have a long product life without causing yellowing, missing, burning, or the like even when an increase in thermal load is caused by a high luminance in a small-sized panel. In addition, the amount of cooling air blowing from a fan to the polarizer can be reduced. Thus, the noise of the fan can be reduced while the fan may have a long product life. Further, the cost can be reduced by reducing the number of parts in contrast to the organic polarizer in which an expensive base material, such as sapphire, should be used for deterioration prevention or a plurality of polarizers should be used.

It is desirable to use absorptive inorganic polarizers as the output-side inorganic polarizers 27, 28, and 29, respectively. When the output-side inorganic polarizers 27, 28, and 29 used are reflective inorganic polarizers, such as WGs, the light reflected thereon becomes light returning to the VA liquid crystal panels 24, 25, and 26. Thus, a decrease in image quality due to the generation of ghost may be caused.

For the incidence-side inorganic polarizers 21, 22, and 23, either the reflective inorganic polarizers or the absorptive inorganic polarizers may be used.

Second Embodiment

Figure 4:
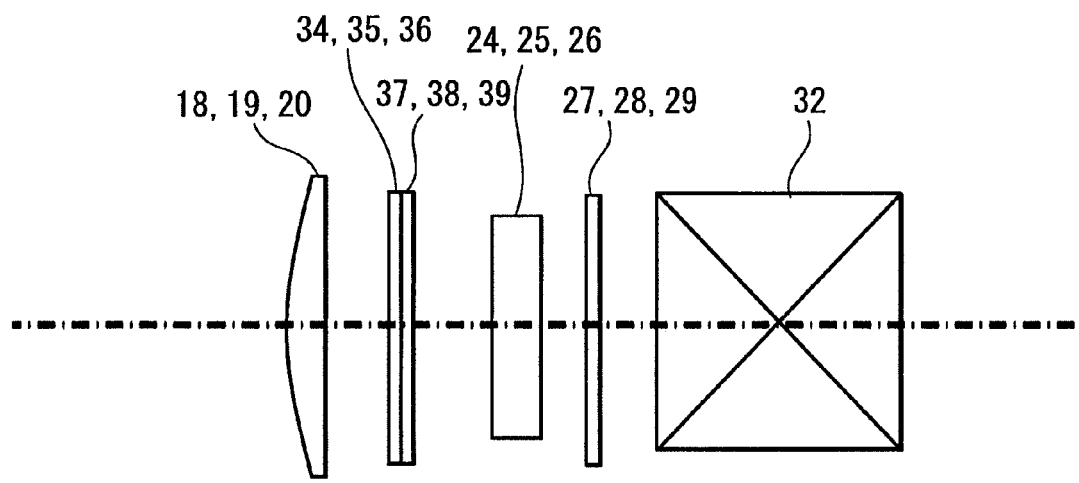
FIG. 4 is a diagram illustrating parts adjacent to a VA liquid crystal panel in an optical system of a projector according to a second embodiment of the invention.

Next, the second embodiment of the invention will be described. FIG. 4 is a diagram illustrating the configuration of the parts adjacent to the liquid crystal panels in the optical system of a projector in accordance with the second embodiment of the invention. The configuration of the optical system other than the parts adjacent to the liquid crystal panels is not shown in the figure, because it is similar to that illustrated in FIG. 1. In addition, the configuration of parts other than polarizers on the incidence side of the liquid crystal panel is identical with that illustrated in FIGS. 1 and 2, so that the same reference numerals are given to those parts.

Incidence-side inorganic polarizers 34, 35, and 36 are reflective inorganic polarizers with extinction ratios of approximately 500:1 to 2000:1, respectively. In addition, additional polarizers 37, 38, and 39 for outputting light incident from the incidence-side inorganic polarizers 34, 35, and 36 are arranged on the incidence-sides of the VA liquid crystal panels 24, 25, and 26. The polarizers 37, 38, and 39 are organic polarizers or absorptive inorganic polarizers with extinction ratios of approximately 2:1 to 20:1.

The incidence-side inorganic polarizers 34, 35, and 36 alone may have insufficient extinction ratios. Thus, the arrangements of additional polarizers 37, 38, and 39 on the incidence sides of the respective VA liquid crystal panels 23, 25, and 26 enable the projector to have a contrast of 1000:1 or more.

The polarizers 37, 38, and 39, which are absorptive polarizers, may be arranged at the rear of the incidence-side inorganic polarizers 34, 35, and 36, which are reflective inorganic polarizers, to prevent multiple reflection due to the light reflected on the incidence-side inorganic polarizers 34, 35, and 36.

In addition, when inorganic polarizers are used as the polarizers 37, 38, and 39, the incidence sides of the respective VA liquid crystal panels 24, 25, and 26 do not contain any organic material and the thermal resistances thereof can be increased. Therefore, the amount of cooling air blowing from a fan can be reduced, so that the noise of the fan may be reduced. Even in the case of using organic polarizers as the polarizers 37, 38, and 39, most of undesired rays of light can be removed by the incidence-side inorganic polarizers 34, 35, and 36. Thus, thermal loads on the respective polarizers 37, 38, and 39 can be reduced and the deterioration rates thereof can be controlled, having effectiveness of suitably maintaining contrast.

Furthermore, though not shown in the figure, turning mechanisms (similar to the one exemplified in FIG. 3) for turning the incidence-side inorganic polarizers 34, 35, and 36, the polarizers 37, 38, and 39, and output-side inorganic polarizers 27, 28, and 29 around the respective optical axes are provided. The turning mechanisms adjust the turning positions of the incidence-side inorganic polarizers 34, 35, and 36, the polarizers 37, 38, and 39, and output-side inorganic polarizers 27, 28, and 29, respectively. Thus, as described in the first embodiment, they can be adjusted so as to have the maximum contrast.

The incidence-side inorganic polarizers 34, 35, and 36 may be bonded to the polarizers 37, 38, and 39 to be integrally provided, respectively. In this case, turning mechanisms may be respectively provided for turning the incidence-side inorganic polarizers 34, 35, and 36 and the polarizers 37, 38, and 39 in combinations around the respective optical axes. In this embodiment, the reflective inorganic polarizers are used as the incidence-side inorganic polarizers 34, 35, and 36. Alternatively, absorptive inorganic polarizers may be used as the incidence-side inorganic polarizers 34, 35, and 36.

Third Embodiment

Figure 5:
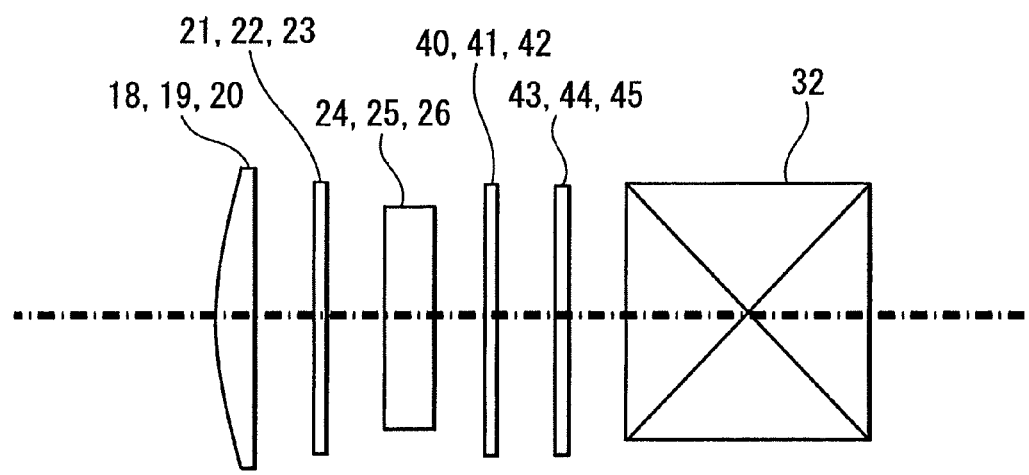
FIG. 5 is a diagram illustrating parts adjacent to a VA liquid crystal panel in an optical system of a projector according to a third embodiment of the invention.

Next, the third embodiment of the present invention will be described. FIG. 5 is a diagram illustrating the configuration of the parts adjacent to the liquid crystal panels in the optical system of a projector in accordance with the third embodiment of the invention. The configuration of the optical system other than the parts adjacent to the liquid crystal panels is not shown in the figure, because it is similar to that illustrated in FIG. 1. In addition, the configuration of parts other than polarizers on the output side of the liquid crystal panel is identical with that illustrated in FIGS. 1 and 2, so that the same reference numerals are given to those parts.

Output-side inorganic polarizers 40, 41, and 42 are absorptive inorganic polarizers with extinction ratios of approximately 2:1 to 20:1, respectively. In addition, additional organic polarizers 43, 44, and 45 for outputting light incident from the output-side inorganic polarizers 40, 41, and 42 are arranged on the output-sides of the VA liquid crystal panels 24, 25, and 26. The organic polarizers 43, 44, and 45 have extinction ratios of approximately 500:1 to 10000:1, respectively.

In this way, the arrangements of the additional organic polarizers 43, 44, and 45 on the output sides of the respective VA liquid crystal panels 24, 25, and 26 enable high extinction ratio and high transmittance to be obtained. It is because the organic polarizer generally has the compatibility between an extinction ratio and a transmittance compared with the inorganic polarizer.

Furthermore, the absorptive inorganic polarizer with a low extinction ratio is used for each of the output-side inorganic polarizers 40, 41, and 42. Thus, the projector set may have a long product life. In other words, the output-side inorganic polarizers 40, 41, and 42 continuously absorb a certain amount of light without deterioration. Thus, the thermal loads on the organic polarizers 43, 44, and 45 can be reduced and the deterioration rates of the respective organic polarizers 43, 44, and 45 due to yellowing, missing, or the like can be reduced. As a result, the contrast of the projector set can be maintained suitably.

Specifically, if the extinction ratios of the respective output-side inorganic polarizers 40, 41, and 42 are 2:1 or more, the output-side inorganic polarizers 40, 41, and 42 will absorb more than half of the heat. Thus, an effect of delaying the deterioration rates of the respective organic polarizers 43, 44, and 45 can be obtained. On the other hand, if the extinction ratios of the respective output-side inorganic polarizers 40, 41, and 42 are 20:1 or more, the transmittance falls and any influence will come out in the luminance. Therefore, preferable extinction ratios of the respective output-side inorganic polarizers 40, 41, and 42 are approximately 2:1 to 20:1. Such configurations can attain the compatibility between contrast and luminance while extending the product life of the projector set.

Furthermore, though not shown in the figure, turning mechanisms (similar to the one exemplified in FIG. 3) for turning the incidence-side inorganic polarizers 21, 22, and 23, the output-side inorganic polarizers 40, 41, and 42, and the organic polarizers 43, 44, and 45 around the respective optical axes are provided. The turning mechanisms adjust the turning positions of the incidence-side inorganic polarizers 21, 22, and 23, the output-side inorganic polarizers 40, 41, and 42, and the organic polarizers 43, 44, and 45, respectively. Thus, as described in the first embodiment, they can be adjusted so as to have the maximum contrast.

Fourth Embodiment

Figure 6:
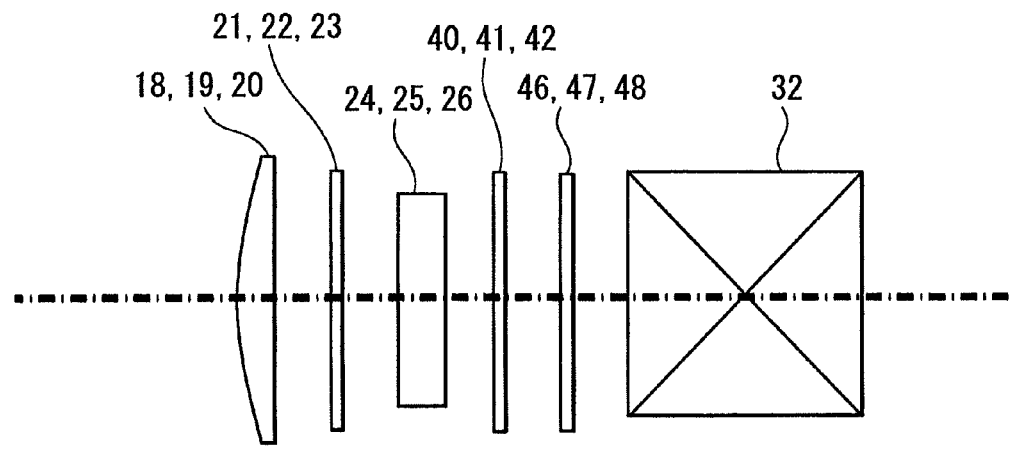
FIG. 6 is a diagram illustrating parts adjacent to a VA liquid crystal panel in an optical system of a projector according to a fourth embodiment of the invention.

Next, the fourth embodiment of the present invention will be described. FIG. 6 is a diagram illustrating the configuration of the parts adjacent to the liquid crystal panels in the optical system of a projector in accordance with the fourth embodiment of the invention. The configuration of the optical system other than the parts adjacent to the liquid crystal panels is not shown in the figure because it is similar to that illustrated in FIG. 1. In addition, the configuration of parts other than polarizers on the output side of the liquid crystal panel is identical with that illustrated in FIGS. 1 and 2, so that the same reference numerals are given to those parts.

The output-side inorganic polarizers 40, 41, and 42 are identical with those used in the third embodiment and thus absorptive inorganic polarizers with extinction ratios of approximately 2:0 to 20:1. In addition, additional inorganic polarizers 46, 47, and 48 for outputting light incident from the output-side inorganic polarizers 40, 41, and 42 are arranged on the output sides of the respective VA liquid crystal panels 24, 25, and 26. The inorganic polarizers 46, 47, and 48 are absorptive inorganic polarizers with low extinction ratios, respectively.

In this case, there is no organic polarizer on the output side of each of the VA liquid crystal panels 24, 25, and 26. Therefore, an improvement in thermal resistance can be attained, while reducing the amount of cooling air blowing from a fan. It is also effective in lowering the noise of the fan.

Furthermore, even if the extinction ratios of the output-side inorganic polarizers 40, 41, and 42 and the inorganic polarizers 46, 47, and 48 are low, respectively, the use of a combination thereof can ensure both the contrast and the transmittance. In addition, there is no deterioration in the output-side inorganic polarizers 40, 41, and 42 and the inorganic polarizers 46, 47, and 48. Thus, the black luminance can be maintained, so that the contrast can be retained and the product life of the projector set can be made long.

Furthermore, though not shown in the figure, turning mechanisms (similar to the one exemplified in FIG. 3) for turning the incidence-side inorganic polarizers 21, 22, and 23, the output-side inorganic polarizers 40, 41, and 42, the inorganic polarizers 46, 47, and 48 around the respective optical axes are provided. The turning mechanisms adjust the turning positions of the incidence-side inorganic polarizers 21, 22, and 23, the output-side inorganic polarizers 40, 41, and 42, and the inorganic polarizers 46, 47, and 48, respectively. Thus, as described in the first embodiment, they can be adjusted so as to have the maximum contrast.

Fifth Embodiment

Figure 7:
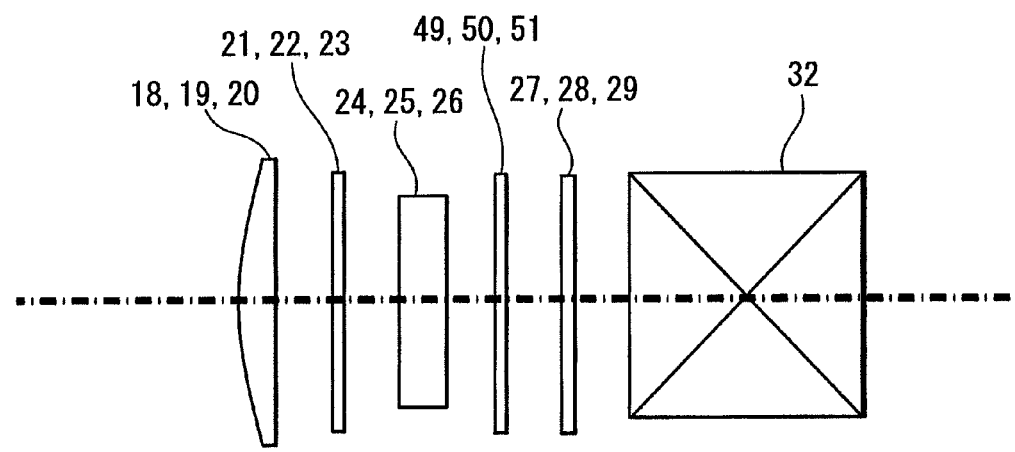
FIG. 7 is a diagram illustrating parts adjacent to a VA liquid crystal panel in an optical system of a projector according to a fifth embodiment of the invention.

Next, the fifth embodiment of the present invention will be described. FIG. 7 is a diagram illustrating the configuration of the parts adjacent to the liquid crystal panels in the optical system of a projector in accordance with the fifth embodiment of the invention. The configuration of the optical system other than the parts adjacent to the liquid crystal panels are not shown in the figure, because it is similar to that illustrated in FIG. 1. In addition, the configuration of polarizers on the incidence side and the output side of the liquid crystal panel is identical with that illustrated in FIGS. 1 and 2, so that the same reference numerals are given to those polarizers.

Optical compensators 49, 50, and 51 are arranged between the VA liquid crystal panels 24, 25, and 26 and output-side inorganic polarizers 27, 28, and 29. Therefore, a further increase in contrast can be attained.

Furthermore, though not shown in the figure, turning mechanisms for turning the incidence-side inorganic polarizers 21, 22, and 23 and the output-side inorganic polarizers 27, 28, and 29 around the respective optical axes are provided similarly to the case of the first embodiment. Also, turning mechanisms (similar to the one exemplified in FIG. 3) for turning the optical compensators 49, 50, and 51 around the optical axes are provided. The turning mechanisms adjust the turning positions of the optical compensators 49, 50, and 51, respectively, so that the phase differences of the respective VA liquid crystal panels 24, 25, and 26 can be offset. In such combinations with the optical compensators 49, 50, and 51, the turning mechanisms of the incidence-side inorganic polarizers 21, 22, and 23 and the output-side inorganic polarizers 27, 28, and 29 can adjust the turning positions of the incidence-side inorganic polarizers 21, 22, and 23, and the output-side inorganic polarizers 27, 28, and 29, respectively. Thus, as described in the first embodiment, they can be adjusted so as to have the maximum contrast.

Furthermore, instead of the optical compensators 49, 50, and 51 or in addition to the optical compensators 49, 50, and 51, optical compensators and turning mechanisms for turning the optical compensators around the optical axes may be provided between the incidence-side inorganic polarizers 21, 22, and 23 and the VA liquid crystal panels 24, 25, and 26.

Sixth Embodiment

Figure 8:
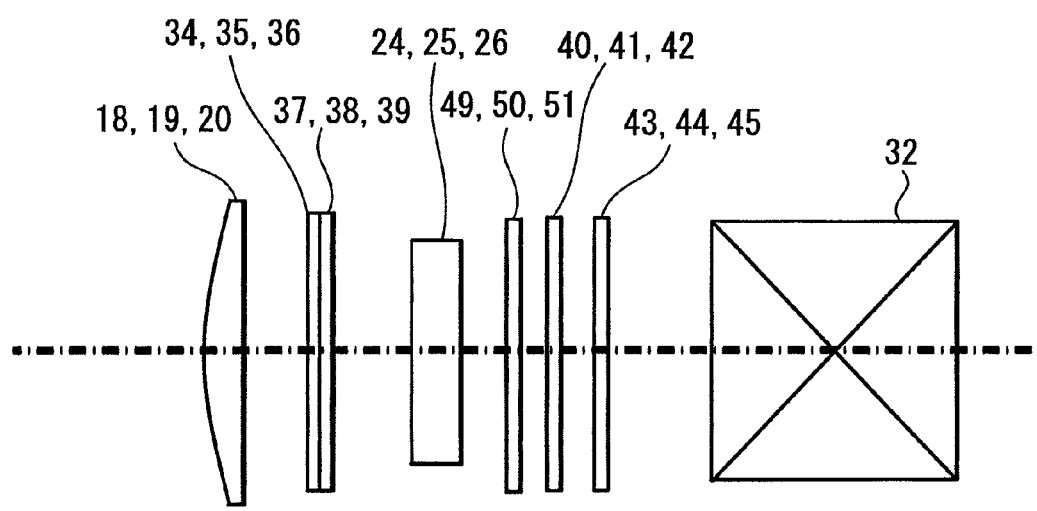
FIG. 8 is a diagram illustrating parts adjacent to a VA liquid crystal panel in an optical system of a projector according to a sixth embodiment of the invention.

Next, the sixth embodiment of the present invention will be described. FIG. 8 is a diagram illustrating the configuration of the parts adjacent to the liquid crystal panels in the optical system of a projector in accordance with the sixth embodiment of the invention. The configuration of the optical system other than the parts adjacent to the liquid crystal panels is not shown in the figure, because it is similar to that illustrated in FIG. 1. In addition, the configuration of parts other than polarizers on the incidence side and the output side of the liquid crystal panel is identical with that represented in FIGS. 1 and 2, so that the same reference numerals are given to those parts.

The sixth embodiment has incorporated all of the contents of the second embodiment, third embodiment, and fifth embodiment. On the incidence sides of the respective VA liquid crystal panels 24, 25, and 26 are arranged the incidence-side inorganic polarizers 34, 35, and 36 (reflective inorganic polarizers with extinction ratios of approximately 500:1 to 2000:1) and the polarizers 37, 38, and 39 (organic polarizers or absorptive inorganic polarizers with extinction ratios of approximately 2:1 to 20:1), which are identical with those of the second embodiment.

On the output sides of the respective VA liquid crystal panels 24, 25, and 26 are arranged the output-side inorganic polarizers 40, 41, and 42 (absorptive inorganic polarizers with extinction ratios of approximately 2:1 to 20:1) and the organic polarizers 43, 44, and 45 (extinction ratios of approximately 500:1 to 10000:1), which are identical with those of the third embodiment.

The optical compensators 49, 50, and 51, which are identical with those of the fifth embodiment, are arranged between the VA liquid crystal panels 24, 25, and 26 and the output-side inorganic polarizers 40, 41, and 42.

Furthermore, though not shown in the figure, turning mechanisms (similar to the one exemplified in FIG. 3) for turning the incidence-side inorganic polarizers 34, 35, and 36, the polarizers 37, 38, and 39, the optical compensators 49, 50, and 51, the output-side inorganic polarizers 40, 41, and 42, and the organic polarizers 43, 44, and 45 around the respective optical axes are provided.

According to the sixth embodiment, all of the following advantageous effects of the second, third, and fifth embodiments can be attained:

(a) As one of the advantageous effects of the second embodiment, even though the incidence-side inorganic polarizers 34, 35, and 36 alone may have insufficient extinction ratios, the projector may have a contrast of 1000:1 or more by arranging additional polarizers 37, 38, and 39 on the incidence-sides of the respective VA liquid crystal panels 24, 25, and 26;

(b) As one of the advantageous effects of the second embodiment, multiple reflection due to light reflected on the incidence-side inorganic polarizers 34, 35, and 36 can be prevented by arranging polarizers 37, 38, and 39, which are absorptive polarizers, at the rear of the incidence-side inorganic polarizers 34, 35, and 36, which are reflective inorganic polarizers;

(c) As one of the advantageous effects of the third embodiment, the arrangements of additional organic polarizers 43, 44, and 45 on the output sides of the respective VA liquid crystal panels 24, 25, and 26 enable high extinction ratio and high transmittances to be obtained;

(d) As one of the advantageous effects of the third embodiment, the output-side inorganic polarizers 40, 41, and 42 continuously absorb a certain amount of light without deterioration, and thus, the thermal loads on the organic polarizers 43, 44, and 45 can be reduced and the deterioration rates of the respective organic polarizers 43, 44, and 45 due to yellowing, missing, or the like can be reduced, as a result, the contrast of the projector set can be maintained suitably; and (e) As one of the advantageous effects of the fifth embodiment, further improvement in contrast can be obtained by arranging the optical compensators 49, 50, and 51.

Note that, in the above first, second, and fifth embodiments, there is no polarizer, which is responsible for outputting light incident from each of the output-side inorganic polarizers 27, 28, and 29, on the output side of each of the VA liquid crystal panels 24, 25, and 26. In these embodiments, the extinction ratios of the respective output-side inorganic polarizers 27, 28, and 29 may not need to be low ratios of 2:1 to 20:1 similar to those of the output-side inorganic polarizers 40, 41, and 42 in the third, fourth, and sixth embodiments. It should be appreciated that the extinction ratios may be higher than those values.

Furthermore, in the above embodiments, one inorganic polarizer is used for each of the incidence-side inorganic polarizers 21, 22, and 23 (FIGS. 1, 2, 5, 6, and 7), the incidence-side inorganic polarizers 34, 35, and 36 (FIGS. 4 and 8), output-side inorganic polarizers 27, 28, and 29 (FIGS. 1, 2, 4, and 7) and the output-side inorganic polarizers 40, 41, and 42 (FIGS. 5, 6, and 8). In contrast, as an alternative example, two or more inorganic polarizers may be used for each of these incidence-side inorganic polarizers and output-side inorganic polarizers.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display apparatus, comprising:
    a light source;
    a PS convertor;
    an integrator constituted by two fly-eye lenses and disposed between the light source and the PS convertor;
    at least one incidence-side polarizer made of an inorganic material;
    a liquid crystal panel for modulating a polarized state of light output from the incidence-side polarizer to output the modulated light;
    at least one output-side polarizer made of an inorganic material for outputting the light incident from the liquid crystal panel;
    a color-composition prism having two ½ wavelength plates directly contacting the color-composition prism on opposite sides,
    wherein green light transmitted through the polarizer is directly incident on the color composition prism; and
    a mechanism for turning each of the incidence-side polarizer and the output-side polarizer around an optical axis,
    wherein the mechanism of turning includes a holder placed in a fixed supporting frame, and the holder has a protrusion being used to turn the holder in the supporting frame,
    wherein liquid crystals in the liquid crystal panel are aligned in a direction perpendicular to a glass substrate without an applied voltage, and
    wherein an organic polarizer is included in the liquid crystal display apparatus as an incidence-side polarizer or an output-side polarizer.

2. The liquid crystal display apparatus according to claim 1, wherein
    the incidence-side polarizer is a reflective inorganic polarizer.

3. The liquid crystal display apparatus according to claim 1, wherein
    the incidence-side polarizer is an absorptive inorganic polarizer.

4. The liquid crystal display apparatus according to claim 1, wherein
    the output-side polarizer is an absorptive inorganic polarizer.

5. The liquid crystal display apparatus according to claim 1, further comprising:
    at least one polarizer made of one of an inorganic material and an organic material, wherein
    the polarizer outputs light incident from the incidence-side polarizer.

6. The liquid crystal display apparatus according to claim 1, further comprising:
    at least one polarizer made of one of an inorganic material and an organic material, wherein
    the polarizer outputs light incident from the output-side polarizer.

7. The liquid crystal display apparatus according to claim 5, wherein
    the incidence-side polarizer is combined with the polarizer which outputs light incident from the incidence-side polarizer.

8. The liquid crystal display apparatus according to claim 5, wherein
    the extinction ratio of the incidence-side polarizer is in the range of 500:1 to 2000:1.

9. The liquid crystal display apparatus according to claim 5, wherein
    the extinction ratio of the polarizer which outputs light incident from the incidence-side polarizer is in the range of 2:1 to 20:1.

10. The liquid crystal display apparatus according to claim 6, wherein
    the extinction ratio of the output-side polarizer is in the range of 2:1 to 20:1.

11. The liquid crystal display apparatus according to claim 6, wherein
    the extinction ratio of the polarizer which outputs light incident from the output-side polarizer is in the range of 500:1 to 10000:1.

12. The liquid crystal display apparatus according to claim 1, wherein
    an optical compensator is arranged on at least one of the incidence-side and the output-side of the liquid crystal panel.

13. The liquid crystal display apparatus according to claim 12, further comprising:
    a mechanism for turning the optical compensator around an optical axis.

* * * * *